United States Patent
Fontaine et al.

(10) Patent No.: US 9,411,100 B2
(45) Date of Patent: Aug. 9, 2016

(54) PHOTONIC LANTERN SPATIAL MULTIPLEXERS WITH MODE SELECTIVITY

(71) Applicant: Alcatel-Lucent USA Inc., Murray Hill, NJ (US)

(72) Inventors: Nicolas K. Fontaine, Aberdeen, NJ (US); Roland Ryf, Keyport, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 24 days.

(21) Appl. No.: 14/033,033

(22) Filed: Sep. 20, 2013

(65) Prior Publication Data

US 2015/0086157 A1    Mar. 26, 2015

(51) Int. Cl.
| | |
|---|---|
| *G02B 6/26* | (2006.01) |
| *G02B 6/14* | (2006.01) |
| *H04J 14/04* | (2006.01) |
| *G02B 6/02* | (2006.01) |
| *G02B 6/028* | (2006.01) |
| *G02B 6/28* | (2006.01) |

(52) U.S. Cl.
CPC . *G02B 6/14* (2013.01); *H04J 14/04* (2013.01); *G02B 6/02042* (2013.01); *G02B 6/0288* (2013.01); *G02B 6/2821* (2013.01)

(58) Field of Classification Search
None
See application file for complete search history.

(56) References Cited

U.S. PATENT DOCUMENTS

| | | | | |
|---|---|---|---|---|
| 3,823,996 A | * | 7/1974 | Kompfner et al. | 385/126 |
| 5,949,931 A | * | 9/1999 | Kitamura | 385/28 |
| 6,611,648 B2 | * | 8/2003 | Kumar et al. | 385/126 |
| 2003/0053788 A1 | * | 3/2003 | Lee et al. | 385/140 |
| 2005/0111848 A1 | * | 5/2005 | Grubb et al. | 398/147 |
| 2011/0243490 A1 | * | 10/2011 | Ryf | 385/1 |
| 2012/0121220 A1 | * | 5/2012 | Krummrich | 385/28 |
| 2012/0163801 A1 | * | 6/2012 | Takenaga et al. | 398/16 |
| 2012/0200854 A1 | * | 8/2012 | Bland-Hawthorn | 356/328 |
| 2012/0224863 A1 | * | 9/2012 | Winzer et al. | 398/158 |
| 2013/0077916 A1 | * | 3/2013 | Mahlab | 385/20 |
| 2013/0230319 A1 | * | 9/2013 | Essiambre et al. | 398/44 |
| 2014/0079353 A1 | * | 3/2014 | Fontaine et al. | 385/14 |
| 2014/0153922 A1 | * | 6/2014 | Ryf et al. | 398/44 |
| 2014/0286648 A1 | * | 9/2014 | Buelow | 398/143 |
| 2015/0043910 A1 | * | 2/2015 | Koebele | H04J 14/04 398/44 |
| 2015/0085351 A1 | * | 3/2015 | Fontaine | H01S 3/094065 359/341.3 |
| 2016/0085024 A1 | * | 3/2016 | Fontaine | G02B 6/04 398/65 |

FOREIGN PATENT DOCUMENTS

EP    2372420 A1 * 10/2011 ............... G02B 6/28

OTHER PUBLICATIONS

D. Noordegraaf et al. Efficient multi-mode to single-mode coupling in a photonic lantern. Optics Express, 17:3:1988-1994, Feb. 2, 2009.*

* cited by examiner

*Primary Examiner* — Mike Stahl
(74) *Attorney, Agent, or Firm* — Loza & Loza, LLP

(57) ABSTRACT

A photonic lantern spatial multiplexer that provides mode selectivity includes a multimode optical waveguide and a plurality of single mode optical waveguides. The single mode cores of the single mode optical waveguides merge with the multimode core of the multimode optical waveguide. At least two of the single mode cores have different respective single mode effective refractive indexes.

20 Claims, 4 Drawing Sheets

FIG. 5A  FIG. 5B

PHOTONIC LANTERN SPATIAL MULTIPLEXERS WITH MODE SELECTIVITY

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND

1. Technical Field

This invention relates generally to optical transmission systems and in particular, but not exclusively, to space-division multiplexing in optical transmission systems.

2. Description of Related Art

Although single-mode fiber (SMF) has been the primary transmission medium for high-speed data transmission, the recent exponential growth of data traffic may exhaust the available capacity of SMF in the near future. To overcome the capacity limitations experienced by SMF, space-division multiplexing (SDM) transmission systems based on multi-core fiber (MCF) or multi-mode fiber (MMF) are being developed.

In a typical SDM transmission system, optical signals are generated and launched onto respective SMFs. Mode multiplexing of the optical signals is achieved using a spatial multiplexer (S-MUX) that then launches the signals carried by the different modes onto a MCF or MMF. At the receiving end of the MCF or MMF, the received signals are mode demultiplexed using a spatial demultiplexer (S-DMUX). The received modes can either be detected by receivers or launched onto another set of SMF's.

Existing S-MUX/S-DMUX devices are either low loss without providing mode selectivity or lossy with mode selectivity. Examples of low loss S-MUX/S-DMUX devices include photonic lanterns and spot multiplexers. An example of a mode-selective lossy S-MUX/S-DMUX device is a phase mask mode multiplexer.

SUMMARY

Embodiments of the present disclosure are directed to low loss photonic lantern spatial multiplexers that provide mode selectivity. The photonic lantern spatial multiplexer includes a multimode optical waveguide and a plurality of single mode optical waveguides. The single mode cores of the single mode optical waveguides merge with the multimode core of the multimode optical waveguide. In addition, the single mode effective refractive indexes of at least two of the single mode cores are different.

In another embodiment, a space-division multiplexing (SDM) optical transmission system with low loss and mode selectivity is achieved using a multimode optical waveguide having a multimode core, a plurality of single mode optical waveguides, each having a respective single mode core, and a photonic lantern spatial demultiplexer. The photonic lantern spatial demultiplexer is configured such that the single mode cores merge with the multimode core. In addition, the single mode effective refractive indexes of at least two of the single mode cores are different.

In some embodiments of any of the above apparatus/systems, the multimode core and the single mode cores are located within an adiabatically tapered capillary tube.

In some embodiments of any of the above apparatus/systems, each of the single mode optical waveguides is configured to guide a different one of a plurality of transverse modes along a respective length thereof and the multimode optical waveguide is configured to guide a plurality of transverse multimodes along a length thereof.

In some embodiments of any of the above apparatus/systems, each non-degenerate transverse mode of the plurality of transverse modes maps to one of the plurality of transverse multimodes based on the respective single mode effective refractive indexes. In addition, each degenerate transverse mode of the plurality of transverse modes maps to a select number of the plurality of transverse multimodes based on the respective single mode effective refractive indexes. The select number of transverse multimodes corresponding to a particular degenerate transverse mode being equal to a number of single mode cores carrying the degenerate transverse mode.

In some embodiments of any of the above apparatus/systems, a first non-degenerate transverse mode propagating in a first single mode core having a first single mode effective refractive index adiabatically transfers into a first transverse multimode associated with a first multimode effective refractive index. The first single mode effective refractive index is higher than any of the other single mode effective refractive indexes and the first multimode effective refractive index is higher than any of the other multimode effective refractive indexes.

In some embodiments of any of the above apparatus/systems, a second non-degenerate transverse mode propagating in a second single mode core that has a second single mode effective refractive index adiabatically transfers into a second transverse multimode associated with a second multimode effective refractive index. The second single mode effective refractive index is less than the first single mode effective refractive index and higher than any of the other single mode effective refractive indexes and the second multimode effective refractive index is less than the first multimode effective refractive index and higher than any of the other multimode effective refractive indexes.

In some embodiments of any of the above apparatus/systems, at least two of the single mode cores have different respective diameters than other ones of the single mode cores.

In some embodiments of any of the above apparatus/systems, a first single mode core has a first diameter and a first effective refractive index and a second single mode core has a second greater diameter and a second greater effective refractive index.

In some embodiments of the above apparatus/systems, each of the single mode cores has substantially the same diameter.

In some embodiments of any of the above apparatus/systems, at least two of the single mode cores include at least one dopant. The single mode effective refractive indexes of the at least two single mode cores being determined based on a concentration of the at least one dopant.

In some embodiments of any of the above apparatus/systems, each of the single mode optical waveguides is a three-dimensional waveguide or an optical fiber.

Some embodiments of any of the above apparatus/systems further include a cladding layer surrounding the plurality of single mode optical waveguides, the cladding layer forming the multimode core upon tapering of the single mode cores.

In some embodiments of any of the above apparatus/systems, the respective length of each of the single mode optical waveguides compensates for a differential group delay between the transverse modes after transmission through the multimode optical waveguide.

Some embodiments of any of the above apparatus/systems further include a plurality of variable optical attenuators, each coupled to a respective one of the single mode optical waveguides. Each of the variable optical attenuators is operable to attenuate a respective one of the transverse modes on a respective one of the plurality of single mode optical waveguides.

Some embodiments of any of the above apparatus/systems further include a controller coupled to the plurality of variable optical attenuators. The controller is operable to set a respective attenuation amount of each of the plurality of variable optical attenuators such that the optical power of each of the transverse modes is substantially equal.

DETAILED DESCRIPTION

Figure 1:
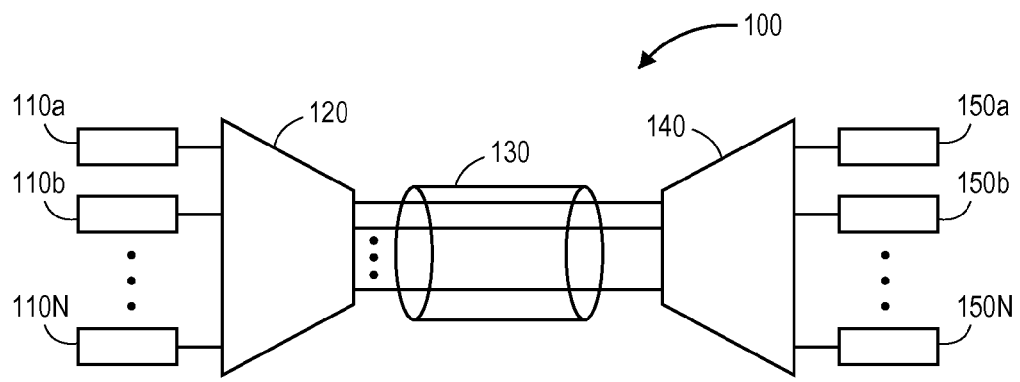
FIG. 1 illustrates a schematic diagram of an embodiment of a space-division multiplexing (SDM) optical transmission system.

FIG. 1 illustrates an embodiment of a space-division multiplexing (SDM) optical transmission system 100. The SDM optical transmission system 100 includes a plurality of input single mode optical waveguides 110a, 110b, ..., 110N, a spatial multiplexer 120, a multimode optical waveguide 130, a spatial demultiplexer 140 and a plurality of output single mode optical waveguides 150a, 150b, ..., 150N, where N can be up to or greater than 20. The input single mode optical waveguides 110a, 110b, ..., 110N are coupled to the multimode optical waveguide 130 via the spatial multiplexer 120. In addition, the output single mode optical waveguides 150a, 150b, ..., 150N are coupled to the multimode optical waveguide via the spatial demultiplexer 140.

Each of the input/output single mode optical waveguides 110a, 110b, ..., 110N and 150a, 150b, ..., 150N guides a single transverse mode (or propagation path) of light along a length thereof, whereas the multimode optical waveguide 130 guides a plurality of transverse modes along a length thereof. The multiple transverse modes propagating within the multimode optical waveguide 130 will be referred to herein as "multimodes" for ease of distinction from transverse modes propagating within single mode optical waveguides 110a, 110b, ..., 110N. The spatial multiplexer 120 launches the individual transverse modes of the input single mode optical waveguides 110a, 110b, ..., 110N onto an orthogonal combination of the plurality of multimodes of the multimode optical waveguide 130. After transmission over the multimode optical waveguide 130, the spatial demultiplexer 140 demultiplexes the multimodes to produce the original individual transverse modes and launches each the individual transverse modes onto a respective one of the plurality of output single mode optical waveguides 150a, 150b, ..., 150N.

Each of the input/output single mode optical waveguides 110a, 110b, ..., 110N and 150a, 150b, ..., 150N and multimode optical waveguide 130 may be, for example, an optical fiber, three-dimensional waveguide or any other type of optical waveguide. The multimode optical waveguide 130 may be, for example, a step-index multimode fiber or a graded-index multimode fiber. Optical fibers may be formed from glass using silica or another material, or may be formed from polymers or any other waveguide material.

The spatial multiplexer 120 and spatial demultiplexer 140 are photonic lanterns that couple between the single mode optical waveguides 110a, 110b, ..., 110N and 150a, 150b, ..., 150N and the multimode waveguide 130 via a gradual adiabatic taper transition. If the number of multimodes is equal to the number of individual transverse modes, substantially no information is lost in the transition, and hence the photonic lantern may be considered to be substantially lossless. However, photonic lantern spatial demultiplexers typically launch a linear combination of the multimodes on each of the output single mode optical waveguides 150a, 150b, ..., 150N, such that contributions from each of the individual input transverse modes are present in each output single mode optical waveguide 150a, 150b, ..., 150N. Therefore, recovering the original information in the individual input transverse modes typically requires additional receivers and Multiple-Input Multiple-Output (MIMO) processing.

In an exemplary embodiment, the photonic lantern spatial multiplexer/demultiplexer 120 and 140 are both substantially lossless and provide mode selectivity. To achieve mode selectivity, the photonic lantern spatial multiplexer 120 is designed to enable each of the transverse modes of the input single mode optical waveguides 110a, 110b, ... 110N to map to one of the multimodes of the multimode optical waveguide 130, as will be explained in more detail below in connection with FIGS. 2-4. Similarly, the photonic lantern spatial demultiplexer 140 is designed to enable each of the multimodes to map to one of the transverse modes of the output single mode optical waveguides 150, 150b, ..., 150N. Therefore, each output transverse mode contains information from only one corresponding input transverse mode.

Figure 2:
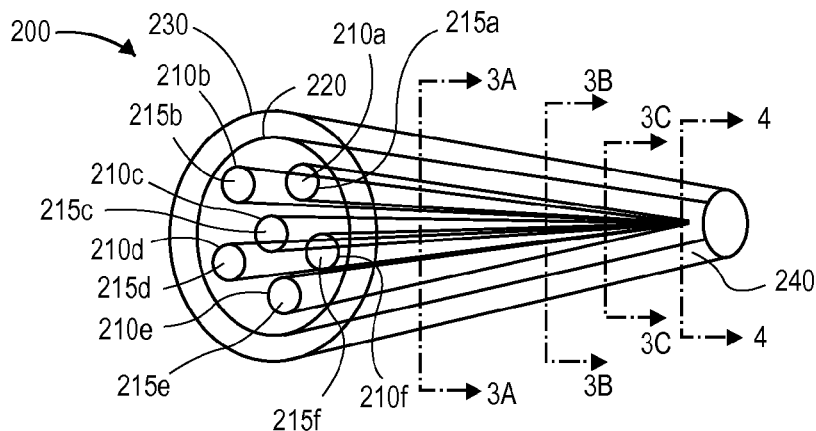
FIG. 2 illustrates a schematic diagram of an embodiment of photonic lantern spatial multiplexer for use within an SDM optical transmission system.

FIG. 2 illustrates an exemplary lossless and mode-selective photonic lantern spatial multiplexer (or demultiplexer) 200 for use within an SDM optical transmission system. The photonic lantern spatial multiplexer 200 includes a plurality of single mode optical waveguides 210a-210f within a capillary tube 230 (i.e., a glass tube). Each of the single mode optical waveguides 210a-210f has a single mode core 215a-215f surrounded by a cladding layer 220. The capillary tube 230 is adiabatically tapered at one end until the single mode cores 215a-215f disappear, leaving the tapered cladding layer 220 and tapered capillary tube 230, which together form a multimode optical waveguide 240.

Figure 3A:
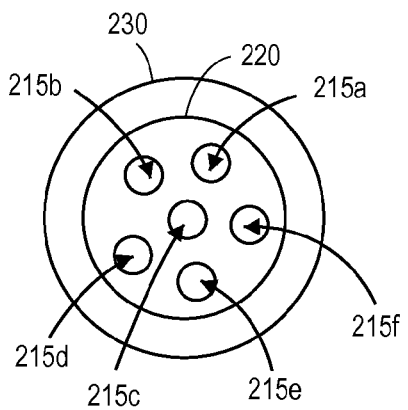
FIGS. 3A-3C illustrate exemplary cross-sectional views of the photonic lantern spatial multiplexer of FIG. 2.
Figure 3B:
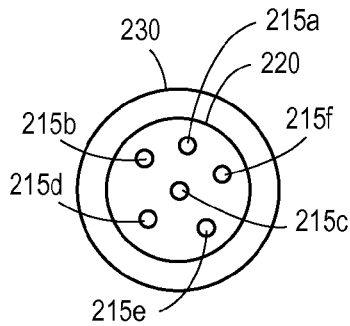
Figure 3C:
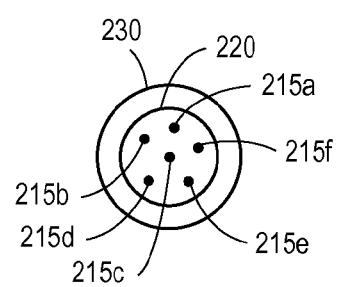

For example, as shown in the cross-sectional views of FIGS. 3A-3C, as the diameter of the capillary tube 230 is tapered, the diameter of the cladding layer 220 and single mode cores 215a-215f are also tapered. With adiabatic tapering, the diameter of the single mode cores 215a-215f varies sufficiently slowly to enable the transverse modes to adiabatically adjust their parameters, so that the transverse mode size remains close to the mode size for a waveguide with constant transverse dimensions equal to the dimensions of the current position within the waveguide.

Figure 4:
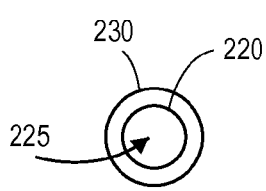
FIG. 4 illustrates another exemplary cross-sectional view of the photonic lantern spatial multiplexer of FIG. 2.

At the end of the photonic lantern, as shown in FIG. 4, the single mode cores have disappeared, and therefore, only the tapered cladding layer 220 remains within the capillary tube 230. The tapered cladding layer 220 serves as the multimode core 225 of the multimode optical waveguide 240 and the capillary tube 230 serves as the cladding layer of the multimode optical waveguide 240.

Referring again collectively to FIGS. 2-4, the single mode cores 215a-215f are shown arranged with five of the single mode cores 215a, 215b, 215d, 215e and 215f in a concentric ring around single mode core 215c. The concentric ring geometrical configuration is scalable with the number of the single mode cores 215a-215f, with the particular geometric configuration of the single mode being determined based on the number of multimodes and the symmetry of the multimodes supported by the multimode optical waveguide 240.

In addition to the geometric configuration of the single mode cores 215a-215f with respect to one another, each of the single mode cores 215a-215f also has an internal geometrical arrangement (diameter, numerical aperture, etc.) to match the transverse mode carried by that single mode core 215a-215f. Furthermore, to provide for mode selectivity at the output of the multimode optical waveguide 240, the effective refractive indexes of the single mode cores 215a-215f carrying non-degenerate transverse modes are different. For degenerate modes, the effective refractive indexes of the corresponding single mode cores 215a-215f are substantially identical.

For example, assuming single mode cores 215e and 215f are carrying non-degenerate transverse modes, the effective refractive index of single mode core 215e is different than the effective refractive index of any of the other single mode cores 215a-215d and 215f, and the effective refractive index of single mode core 215f is different than the effective refractive index of any of the other single mode cores 215a-215e.

Again, assuming single mode cores 215a and 215b are carrying a first degenerate transverse mode (i.e., the transverse modes in each of single mode cores 215a and 215b are substantially identical), the effective refractive index of single mode cores 215a and 215b are substantially identical, but also different than the effective refractive indexes of any of the other single mode cores 215c-215f. Similarly, assuming single mode cores 215c and 215d are carrying a second degenerate transverse mode (i.e., the transverse modes in each of single mode cores 215c and 215d are substantially identical), the effective refractive index of single mode cores 215c and 215d are substantially identical, but also different than the effective refractive indexes of any of the other single mode cores 215c-215f.

In an embodiment, the effective refractive index of each of the single mode cores 215a-215f is selected such that each of the non-degenerate transverse modes maps to one of the multimodes. For example, during the adiabatic taper, the non-degenerate transverse mode in the single mode core with the highest effective refractive index can adiabatically transfer to the multimode with the highest effective refractive index in the multimode core 225. Similarly, the non-degenerate transverse mode in the single mode core with the second-highest effective refractive index can adiabatically transfer to the multimode with the second-highest effective refractive index in the multimode core 225, and so on. Degenerate transverse modes can also adiabatically transfer to multimodes based on the effective refractive indexes of their single mode cores. For example, assuming single mode cores 215a and 215b are each carrying a first degenerate transverse mode, the first degenerate transverse modes can adiabatically transfer to two multimodes based on the effective refractive indexes of the single mode cores 215a and 215b.

In an exemplary operation of the photonic lantern spatial multiplexer 200, as will be described in connection with FIGS. 2-4, at the beginning of the taper transition, the transverse modes of the single mode cores 215a-215f start to spread out of the cores 215a-215f, and as the individual single mode cores 215a-215f become gradually less significant in guidance, the spatial profiles and confinement of the transverse modes begin to be governed by the lower refractive index cladding layer 220. Therefore, after adiabatic tapering, the transverse modes originally guided by the single mode cores 215a-215f become guided by the multimode core 225 as respective multimodes.

Likewise, in the reverse (where the photonic lantern is operating as a spatial demultiplexer), each of the multimodes propagating in the multimode core 225 can be adiabatically transferred to one of the output single mode cores 215a-215f with substantially no power loss (i.e., substantially no loss in the signals/information) based on the effective refractive index of the output single mode cores 215a-215f. Thus, multimodes corresponding to non-degenerate transverse modes will transfer to individual respective output single mode cores 215a-215f based on the effective refractive indexes of the multimodes and the output single mode cores 215a-215f. In addition, two multimodes corresponding to a particular degenerate mode will transfer to two output single mode cores 215a-215f based on the effective refractive indexes of the multimodes and the output single mode cores 215a-215f. Since each single mode core 215a-215f at the output of the photonic lantern spatial demultiplexer 200 then carries information from only a single original transverse mode (prior to coupling to a multimode optical waveguide), additional receivers and MIMO processing are not necessary.

Figure 5:
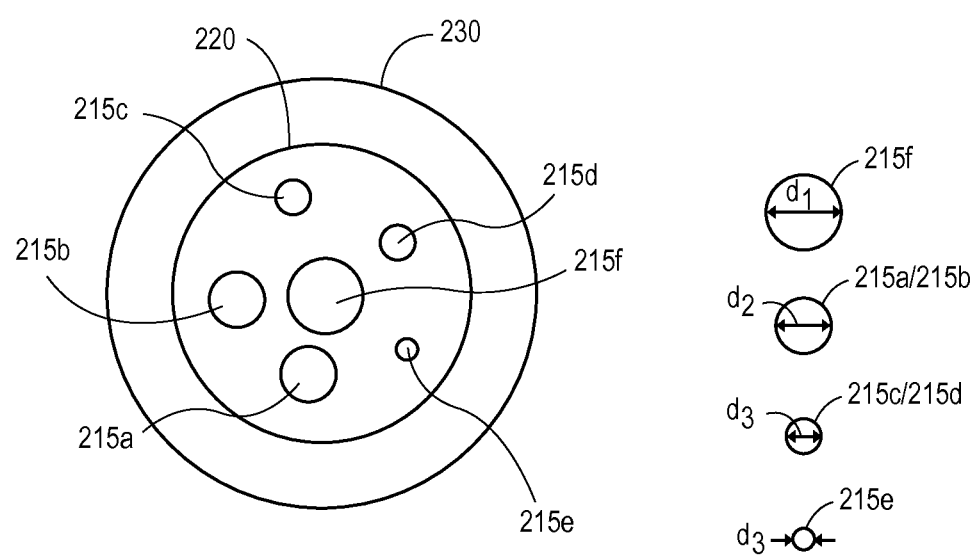
FIG. 5A illustrates an exemplary cross-sectional view of an embodiment of the photonic lantern spatial multiplexer.
FIG. 5B illustrate exemplary single mode cores within the photonic lantern spatial multiplexer of FIG. 5A.

To provide at least two of the single mode cores 215a-215f with different effective refractive indexes, in one embodiment, at least two of the single mode cores 215a-215f have different respective sizes at each transverse position along the photonic lantern. Thus, as shown in the cross-sectional views of FIGS. 5A and 5B, the diameter $d_1$ of single mode core 215f (which is carrying a first non-degenerate transverse mode) is greater than the diameter $d_2$ of single mode cores 215a and 215b (which are carrying a first degenerate transverse mode), the diameter $d_2$ of single mode cores 215a and 215b is greater than the diameter $d_3$ of single mode cores 215c and 215d (which are carrying a second degenerate transverse mode), and the diameter $d_3$ of single mode cores 215c and 215d is greater than the diameter $d_4$ of single mode core 215e (which is carrying a second non-degenerate transverse mode) at a particular transverse position of the photonic lantern.

In another embodiment, the respective sizes of the single mode cores 215a-215f are substantially the same along the length of the photonic lantern. In this embodiment, to achieve the different effective refractive indexes of the single mode cores 215a-215c, one or more dopants and/or different amounts thereof are added to the material forming the single mode cores 215a-215c. Examples of dopants include, but are not limited to, Germania, phosphorus pentoxide, alumina, fluorine, boron oxide and rare earth ions.

Figure 6:
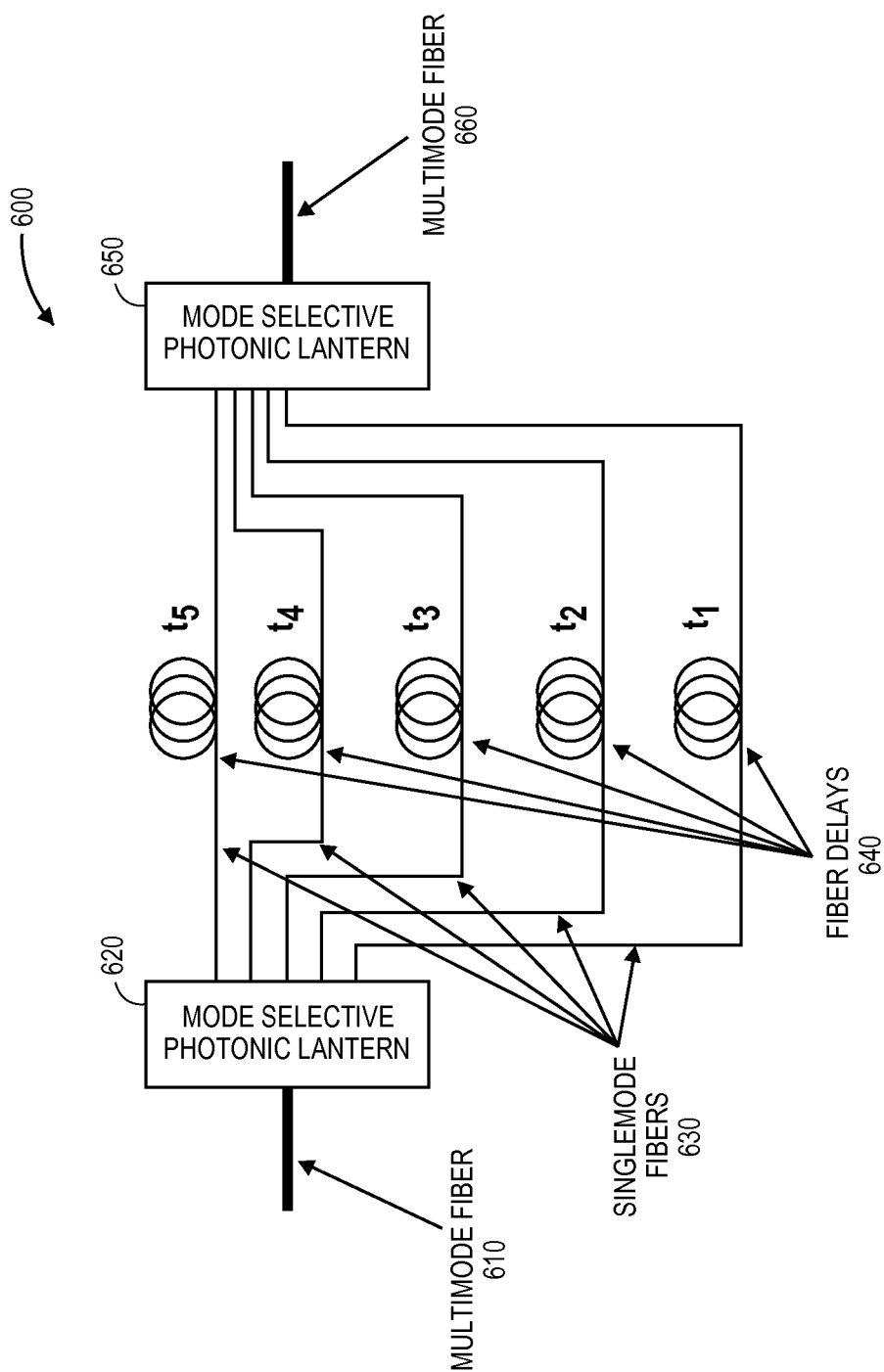
FIG. 6 illustrates a schematic diagram of an embodiment of an SDM optical transmission system with single mode fiber delays to compensate for differential group delay.

By providing mode selectivity, the photonic lantern spatial multiplexer/demultiplexer can facilitate different operations of SDM transmission systems. For example, in one embodiment, the photonic lantern spatial multiplexer/demultiplexer can facilitate differential group delay compensation. FIG. 6 illustrates a schematic diagram of an embodiment of an SDM optical transmission system 600 configured to compensate for differential group delay. The SDM optical transmission system 600 includes a first multimode fiber 610, a mode selective photonic lantern spatial demultiplexer 620, a plurality of single mode fibers 630, a mode selective photonic lantern spatial multiplexer 650 and a second multimode fiber 660.

As the multimodes traverse the first multimode fiber 610, the multimodes (and hence, the transverse modes) may experience some differential group delay (i.e., differences between the propagation times of the multimodes). To determine the differential group delay in the first multimode fiber 610, a single light pulse can be sent into all multimodes of the first multimode fiber 610, and at the output of the mode selective photonic lantern spatial demultiplexer 620, the time delays between pulses traveling in different modes can be measured by detecting all of the modes at the same time on an optical detector (not shown).

Once the time delays are measured, the respective lengths of the single mode fibers 630 are changed, until the time delay introduced between the modes during propagation in the first multimode fiber 610 is compensated. In one embodiment, fiber delays 640 can be added to one or more of the single mode fibers 630 to compensate for the differential group delay. As shown in FIG. 6, respective fiber delays 640 can be added to each of the single mode fibers 630 to delay the transverse modes propagating in each of the single mode fibers 630 by a respective time ($t_1$, $t_2$, $t_3$, $t_4$ and $t_5$), thus ensuring that each of the transverse modes arrives at the mode selective photonic lantern spatial multiplexer 650 at substantially the same time to be multiplexed onto the multimodes of the second multimode fiber 660.

In an embodiment, DGD compensation is a static correction, and the additional fiber delays 640 can be introduced by splicing in additional pieces of fibers, cutting existing fibers shorter or using connectors and adding connectorized fibers with different lengths. The delay should be preferentially compensated within a corresponding length of 1 to 2 cm (50 or 100 ps). In other embodiments, DGD compensation may be dynamic. It should be understood that there are many different techniques and instruments that can measure the DGD, and the present disclosure is not limited to any particular technique or instrument.

Figure 7:
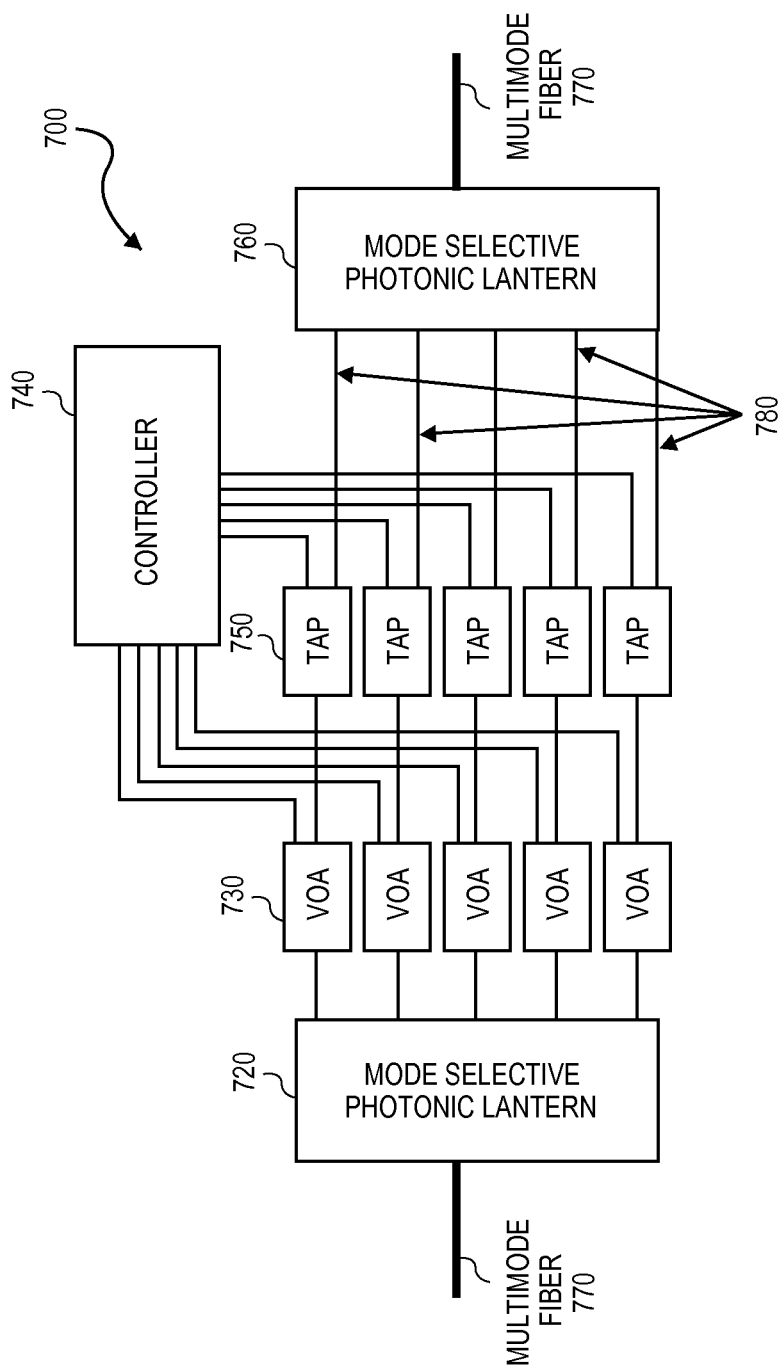
FIG. 7 illustrates a schematic diagram of an embodiment of an SDM optical transmission system with mode equalization.

In another embodiment, the photonic lantern spatial multiplexer/demultiplexer can facilitate mode equalization. FIG. 7 illustrates a schematic diagram of an embodiment of an SDM optical transmission system 700 with mode equalization. The SDM optical transmission system 700 includes a first multimode fiber 710, a mode selective photonic lantern spatial demultiplexer 720, a plurality of variable optical attenuators 730, a controller 740, a plurality of taps 750, a plurality of single mode fibers 780, a mode selective photonic lantern spatial multiplexer 760 and a second multimode fiber 770.

As the multimodes traverse the first multimode fiber 710, the multimodes (and hence, the transverse modes) may experience different levels of attenuation. To equalize the optical power between the transverse modes, the variable optical attenuators can apply respective attenuations to each of the transverse modes at the output of the mode selective photonic lantern demultiplexer 720. The attenuation amounts applied by each variable optical amplifier can be set based on a feedback control circuit including the controller 740 and the plurality of taps 750. Each of the taps 750 extracts a small amount of optical power (typically less than 1%) from a respective single mode fiber 780 and directs the extracted light to the controller 740. In one embodiment, the controller includes, for example, a plurality of optical detectors, which convert the received extracted light to electrical signals. In another embodiment, the taps 750 can further include optical detectors that convert the extracted light to electrical signals. The controller 740, based on the electrical signals, sets the attenuation amount in each of the variable optical attenuators to equalize the optical power in each of the single mode fibers 780 prior to coupling back to the second multimode fiber 770 via the mode selective photonic lantern spatial multiplexer 760.

As may be used herein, the term "controller" includes a "processor," which may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor may further include memory and/or an integrated memory element, which may be a single memory device, a plurality of memory devices, and/or embedded circuitry of another processor. Such a memory device may be a read-only memory, random access memory, volatile memory, non-volatile memory, static memory, dynamic memory, flash memory, cache memory, and/or any device that stores digital information. Note that the memory element may store, and the processor executes, hard coded and/or operational instructions corresponding to at least some of the steps and/or functions described herein. Such a memory element can be included in an article of manufacture.

As may further be used herein, the term "substantially" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences.

As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An apparatus, comprising:
   a multimode optical waveguide having a multimode core;
   a plurality of single mode optical waveguides, each having one of a corresponding plurality of respective single mode cores;
   an adiabatically tapered capillary tube, the multimode core and the single mode cores located within the adiabatically tapered capillary tube, wherein the single mode cores merge with the multimode core; and
   wherein respective single mode effective refractive indexes of at least two of the single mode cores are different.

2. The apparatus of claim 1, wherein:
   each of the single mode optical waveguides is configured to guide a different one of a plurality of transverse modes along a respective length thereof; and
   the multimode optical waveguide is configured to guide a plurality of transverse multimodes along a length thereof.

3. The apparatus of claim 2, wherein each non-degenerate transverse mode of the plurality of transverse modes maps to one of the plurality of transverse multimodes based on respective single mode effective refractive indexes of the single mode optical waveguides and each degenerate transverse mode of the plurality of transverse modes maps to a select number of the plurality of transverse multimodes based on the respective single mode effective refractive indexes, the select number of transverse multimodes corresponding to a particular degenerate transverse mode being equal to a number of single mode cores configured to carry the particular degenerate transverse mode.

4. The apparatus of claim 3, wherein a first single mode core having a first single mode effective refractive index is configured to adiabatically couple a first non-degenerate transverse mode of an optical signal to a first transverse multimode associated with a first multimode effective refractive index of the multimode optical waveguide, the first single mode effective refractive index being greater than a respective single mode refractive index of each single mode core of the remaining plurality of single mode cores, and the first multimode effective refractive index being greater than any of other multimode effective refractive indexes associated with other transverse multimodes of said multimode optical waveguide.

5. The apparatus of claim 4, wherein a second single mode core having a second single mode effective refractive index is configured to adiabatically couple a second non-degenerate transverse mode of an optical signal to a second transverse multimode associated with a second multimode effective refractive index of the multimode optical waveguide, the second single mode effective refractive index being less than the first single mode effective refractive index and greater than a respective single mode refractive index of each single mode core of the remaining plurality of single mode cores, and the second multimode effective refractive index being less than the first multimode effective refractive index and greater than any of other multimode effective refractive indexes associated with other transverse multimodes of said multimode optical waveguide.

6. The apparatus of claim 1, wherein at least two of the single mode cores have different respective diameters.

7. The apparatus of claim 6, wherein a first single mode core has a first diameter and a first effective refractive index and a second single mode core has a second greater diameter and a second greater effective refractive index.

8. The apparatus of claim 1, wherein the at least two of the single mode cores include at least one dopant, the single mode effective refractive indexes of the at least two single mode cores being determined based at least on a concentration of the at least one dopant.

9. The apparatus of claim 1, wherein each of the single mode optical waveguides is a three-dimensional waveguide or an optical fiber.

10. An apparatus, comprising:
    a multimode optical waveguide having a multimode core;
    a plurality of single mode optical waveguides, each having a respective single mode core, the single mode cores tapering to merge with the multimode core and wherein at least two of the single mode cores have different respective diameters; and
    a cladding layer surrounding the plurality of single mode optical waveguides, the cladding layer forming the multimode core upon tapering of the single mode cores.

11. An apparatus, comprising:
    a multimode optical waveguide having a multimode core;
    a plurality of single mode optical waveguides, each having a respective single mode core; and
    a photonic lantern spatial demultiplexer configured such that the single mode cores merge with the multimode core,
    wherein each of the plurality of single mode optical waveguides is configured to guide a different one of a plurality of transverse modes along a respective length thereof,
    wherein the multimode optical waveguide is configured to guide a plurality of transverse multimodes along a length thereof,
    wherein the respective length of each of the plurality of single mode optical waveguides compensates for a differential group delay between the transverse modes after transmission through the multimode optical waveguide; and
    wherein respective single mode effective refractive indexes of at least two of the single mode cores are different.

12. The apparatus of claim 11, wherein the photonic lantern spatial demultiplexer further includes a capillary tube, the capillary tube being adiabatically tapered to merge the single mode cores with the multimode core.

13. The apparatus of claim 11, further comprising:
    a plurality of variable optical attenuators, each coupled to a respective one of the plurality of single mode optical waveguides, each of the variable optical attenuators operable to attenuate a respective one of the transverse modes on a respective one of the plurality of single mode optical waveguides.

14. The apparatus of claim 13, further comprising:
    a controller coupled to the plurality of variable optical attenuators and operable to set a respective attenuation amount of each of the plurality of variable optical attenuators such that the optical power of each of the transverse modes is substantially equal.

15. The apparatus of claim 11, wherein each non-degenerate transverse mode of the plurality of transverse modes maps to one of the plurality of transverse multimodes based on respective single mode effective refractive indexes and each degenerate transverse mode of the plurality of transverse modes maps to a select number of the plurality of transverse multimodes based on the respective single mode effective refractive indexes, the select number of transverse multimodes corresponding to a particular degenerate transverse mode being equal to a number of single mode cores configured to carry the particular degenerate transverse mode.

16. The apparatus of claim 11, wherein the at least two of the single mode cores have different respective diameters, each corresponding to the different respective single mode effective refractive indexes.

17. The apparatus of claim 11, wherein each of the single mode cores has substantially the same diameter and at least two of the single mode cores include at least one dopant, the single mode effective refractive indexes of each of the at least two single mode cores being different based on a concentration of the at least one dopant.

18. The apparatus of claim 10, wherein:
   each of the single mode optical waveguides is configured to guide a different one of a plurality of transverse modes along a respective length thereof; and
   the multimode optical waveguide is configured to guide a plurality of transverse multimodes along a length thereof.

19. The apparatus of claim 10, wherein respective single mode effective refractive indexes of at least two of the single mode cores are different.

20. The apparatus of claim 11, wherein the single mode cores are tapered and then disappear in the multimode core.

* * * * *